US012655822B2

(12) United States Patent
Eckl

(10) Patent No.: US 12,655,822 B2
(45) Date of Patent: Jun. 16, 2026

(54) SUCTION COVER DEVICE, AND KINETIC TIDAL POWER PLANT

(71) Applicant: ENERGYMINER GMBH, Inning am Ammersee (DE)

(72) Inventor: Richard Eckl, Inning am Ammersee (DE)

(73) Assignee: ENERGYMINER GMBH, Inning am Ammersee (DE)

( * ) Notice: Subject to any disclaimer, the term of this patent is extended or adjusted under 35 U.S.C. 154(b) by 0 days.

(21) Appl. No.: 18/290,592

(22) PCT Filed: Jun. 30, 2022

(86) PCT No.: PCT/EP2022/068051
§ 371 (c)(1),
(2) Date: Jan. 19, 2024

(87) PCT Pub. No.: WO2023/001516
PCT Pub. Date: Jan. 26, 2023

(65) Prior Publication Data
US 2024/0254957 A1 Aug. 1, 2024

(30) Foreign Application Priority Data
Jul. 22, 2021 (EP) .................................... 21187252

(51) Int. Cl.
*F03B 13/26* (2006.01)
*F03B 11/02* (2006.01)

(52) U.S. Cl.
CPC ............ *F03B 13/26* (2013.01); *F03B 11/025* (2013.01); *F05B 2240/13* (2013.01); *F05B 2250/232* (2013.01); *F05B 2250/5012* (2013.01)

(58) Field of Classification Search
CPC ........ F03B 11/08; F03B 11/025; F03B 13/26; F05B 2240/13; F05B 2250/02; F05B 2250/232
See application file for complete search history.

(56) References Cited

U.S. PATENT DOCUMENTS

| | | | | | |
|---|---|---|---|---|---|
| 3,986,787 | A * | 10/1976 | Mouton, Jr. | F03B 17/061 | 415/121.2 |
| 4,025,220 | A * | 5/1977 | Thompson | F03B 17/061 | 415/908 |

(Continued)

FOREIGN PATENT DOCUMENTS

| | | | |
|---|---|---|---|
| CN | 102792011 | A | 11/2012 |
| CN | 103032257 | A | 4/2013 |

(Continued)

OTHER PUBLICATIONS

International Search report PCT/EP2022/068051 dated Sep. 13, 2022 (pp. 1-3).

(Continued)

*Primary Examiner* — Courtney D Heinle
*Assistant Examiner* — Cameron A Corday
(74) *Attorney, Agent, or Firm* — Millen, White, Zelano & Branigan P.C.; William F. Nixon

(57) ABSTRACT

The present invention provides a suction cover device for a kinetic tidal power plant, comprising: a flow inlet opening and a flow outlet opening arranged along a flow direction downstream of the flow inlet opening and a plurality of cover housing segments which extend between the flow inlet opening and the flow outlet opening substantially in the flow direction and are provided such that the plurality of cover housing segments collectively form a conically shaped cover body, wherein the plurality of cover housing segments are continuously movable relative to one another between a first extreme position and a second extreme position such that the (Continued)

flow velocity inside the suction cover device can be controlled compared to the surrounding flow.

6 Claims, 7 Drawing Sheets

(56) References Cited

U.S. PATENT DOCUMENTS

| | | | | |
|---|---|---|---|---|
| 4,166,596 | A * | 9/1979 | Mouton, Jr. | F03D 9/25<br>244/33 |
| 6,872,232 | B1 * | 3/2005 | Pavlatos | F02C 7/055<br>55/306 |
| 7,442,002 | B2 | 10/2008 | Mondl | |
| 9,745,951 | B1 * | 8/2017 | Doyle | F03B 17/061 |
| 2013/0099502 | A1 | 4/2013 | Roberts | |
| 2014/0030059 | A1 | 1/2014 | Presz, Jr. et al. | |
| 2018/0017036 | A1 * | 1/2018 | Steiner | F03D 1/04 |

FOREIGN PATENT DOCUMENTS

| | | | |
|---|---|---|---|
| DE | 19626360 | A1 | 1/1998 |
| DE | 202012002133 | U1 | 4/2012 |
| EP | 1747373 | B1 | 1/2005 |
| WO | 2005078276 | A | 8/2005 |
| WO | 2012135638 | A1 | 10/2012 |

OTHER PUBLICATIONS

Search report in corresponding EP application 21187252 dated Dec. 14, 2021 (pp. 1-2).

Chinese Office Action dated Mar. 16, 2026 issued in corresponding application 202280051435.1.

* cited by examiner

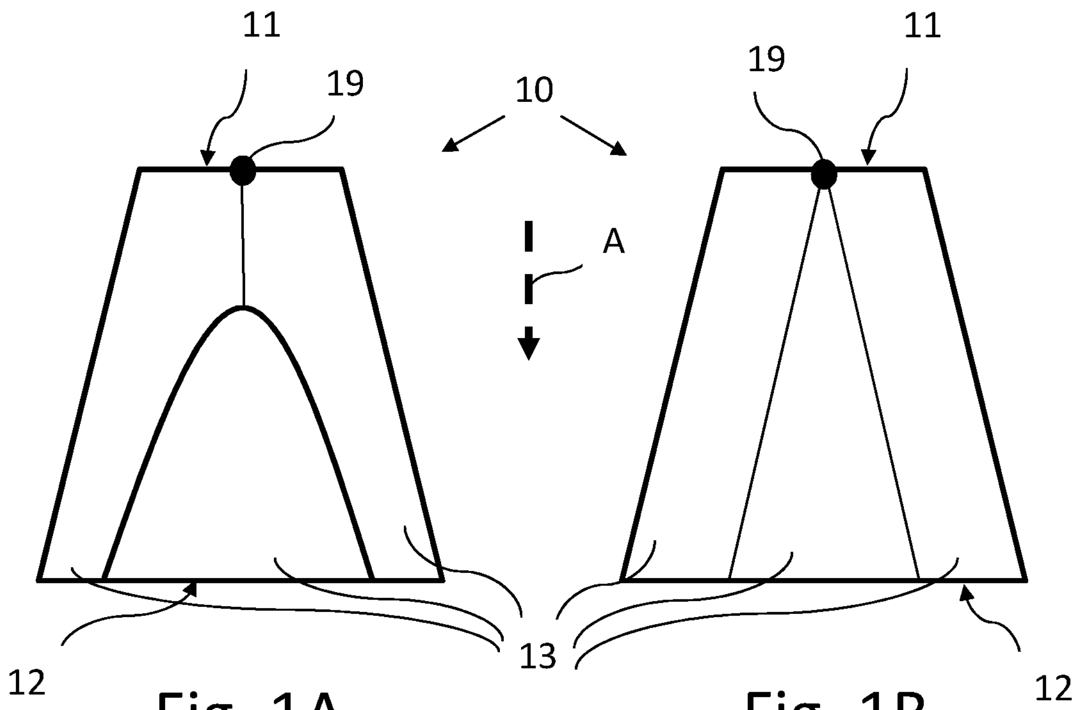
Fig. 1A
Fig. 1B
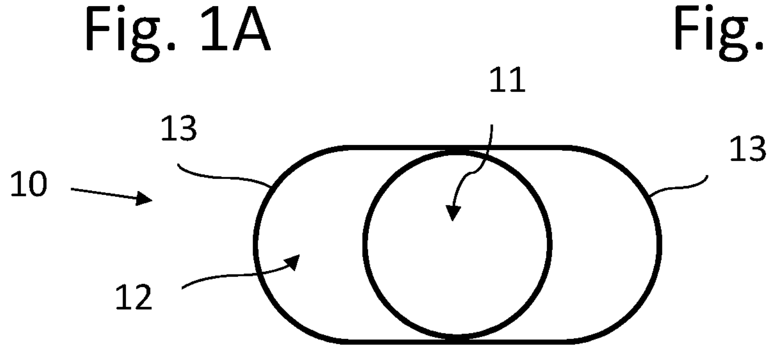
Fig. 2
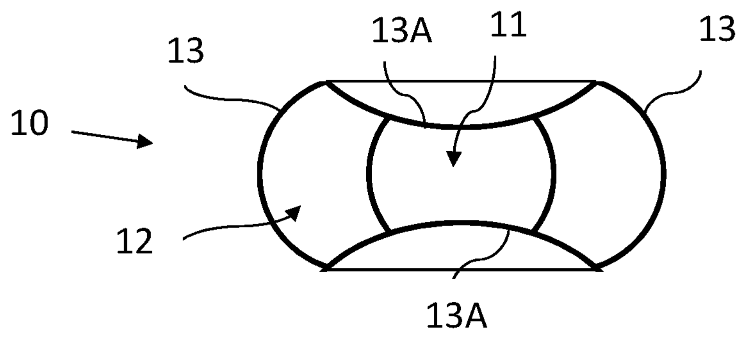
Fig. 3A

SUCTION COVER DEVICE, AND KINETIC TIDAL POWER PLANT

The present invention relates to a suction cover device for a kinetic tidal power plant and to a kinetic tidal power plant with such a suction cover device.

The constantly increasing demand for energy is being met by methods of energy generation developed worldwide. In this respect, there is a growing need to make energy generation as environmentally friendly as possible so as to prevent damage to the environment. These requirements place a significant role on hydropower as a source of renewable energy.

Until now, electricity has been generated almost exclusively from artificially dammed water, usually in river valleys, in fast or slow-running turbines, depending on the drop height. In this manner, nature is heavily affected, since the dam walls form an almost insurmountable obstacle for fish, for example, or aquatic animals are passes through the generators. For various reasons, further development with such power plants is therefore no longer favored, or is hardly possible, expensive and facing considerable adversity.

An alternative way of using hydropower is to generate electricity in a watercourse without building a weir such as a dam. This is attempted, for example, using the so-called current buoys, which form a floating current power plant that converts the kinetic energy of a free-flowing, undammed river into electrical energy, whereas the current buoy floats slightly below the surface of the water.

For example, EP 1 747 373 A1 describes a tidal turbine installation for generating electrical energy in freely flowing waters with slow-running, axially loaded turbine wheels with a generator in a ring-shaped floating body.

However, known kinetic hydropower plants require a relatively high flow velocity of around two meters per second in order to achieve a significant output and to be economically viable.

It is the underlying object of the present invention to provide a suction cover device which increases the application possibilities for a kinetic tidal power plant.

According to the invention, the object is achieved by the objects of the independent claims.

According to a first aspect of the invention, a suction cover device for a kinetic tidal power plant is provided. The suction cover device comprises a flow inlet opening and a flow outlet opening arranged along a flow direction downstream of the flow inlet opening. Furthermore, the suction cover housing device contains a plurality of cover housing segments which extend substantially in the flow direction between the flow inlet opening and the flow outlet opening and are provided in such a way that the plurality of cover housing segments collectively form a conically shaped cover body. In this respect, the several cover housing segments are continuously movable relative to one another between a first extreme position and a second extreme position in such a way that the flow velocity inside the suction cover device can be controlled compared to the surrounding flow.

According to a second aspect of the invention, a kinetic tidal power plant is provided. The tidal power plant comprises a flow generator and a computing device, which is arranged along a flow direction upstream of a flow inlet of the flow generator and is configured to protect the flow generator from solid foreign bodies. In addition, the tidal power plant comprises a suction cover device according to the invention, which is arranged downstream of the flow generator and the flow inlet opening of which corresponds to the outer dimensions of the flow generator.

One idea underlying the present invention is to provide a variably adjustable suction cover device which depending on a flow velocity of the fluid flowing towards the suction cover device adjusts itself in such a way that the flow velocity inside the suction cover device, in particular at the flow inlet opening, deviates less from a predetermined value compared to the flow velocity of the incoming fluid.

Thus, for example, the suction cover device can provide the flow velocity for a tidal power plant that can be arranged in the flow inlet opening in a desired velocity range, regardless of the flow velocity of the incoming fluid. In particular, this makes it possible to achieve an optimal operating point for the tidal power plant.

The flow direction within the meaning of the present invention is defined as the predetermined direction of flow of a fluid from the flow inlet opening to the flow outlet opening. This means that the flow direction corresponds to the longitudinal direction of the suction cover device. In addition, the longitudinal direction of the suction cover device corresponds to the longitudinal direction of the kinetic tidal power plant, i.e. the term longitudinal direction in the sense of the present invention applies to both the suction cover device and the tidal power plant.

The term extreme position refers to a state of the plurality of cover housing segments in which the movability of the cover housing segments of the plurality of cover housing segments, which are movable relative to one another, is restricted in at least one direction of movement. This means, for example, that two cover housing segments that are to be pivoted towards each other are pivoted until they make contact and can therefore only be pivoted away from each other in this state. The extreme position is also present if the direction of movement is blocked by third components, such as the limited stroke of a damper or a spring or other movement-blocking devices. In particular, the plurality of cover housing segments also have an extreme position if only one degree of freedom is provided and within this degree of freedom one of the two directions of movement, for example a linear movement to the left as opposed to a linear movement to the right, is blocked.

Advantageous embodiments and further embodiments are shown in the sub-claims referring back to the independent claims and in the description with reference to the figures.

According to one embodiment, the suction cover device is designed as oval, circular or the like when viewed transversely to the flow direction. In this way, the suction cover device has a shape suitable for compressive loads.

According to a further embodiment of the suction cover device, at least some of the plurality of cover housing segments are made of an elastic material. This means that the elastic cover housing segments can become increasingly elastic as the flow velocity increases and reversibly deform again as the flow velocity decreases. The deformation degree can be determined by the properties of the material composition and the dimensioning, in particular by the material thickness, to predetermined flow velocities.

According to a further development of the suction cover device, the material composition and/or the geometry of the elastic cover housing segments varies along their extension in such a way that the spring constant of these elastic cover housing segments varies along their extension. In this way, the deformation of the elastic cover housing segments can be optimized so that certain portions deform more or less compared to other portions of the cover housing segments.

According to a further embodiment, the suction cover device further comprises a spring device and/or an actuator for supporting the movability of the plurality of cover housing segments between the first extreme position and the second extreme position, wherein the spring device and/or the actuator couples at least some of the plurality of cover housing segments to one another. This means, for example, that the actuator can actively move the cover housing segments independently of the flow velocity. In addition, certain movements of the cover housing segments depending on the flow velocity can be reduced by the spring device, for example, as the spring device counteracts deviations from the optimal position with its spring force.

According to a further embodiment of the suction cover device, the plurality of cover housing segments are provided to be movable relative to one another substantially along the flow direction. This means that the suction cover device can extend longer or shorter in the longitudinal direction. In this respect recesses/gaps can be provided between the cover housing segments from an intermediate position of the plurality of cover housing segments of the suction cover device, wherein the recesses are configured so that flow can pass through them.

According to a further embodiment of the suction cover device, the plurality of cover housing segments are provided to be movable relative to one another substantially transversely to the flow direction. This means that the suction cover device can extend transversely to the longitudinal direction, either wider or narrower. In this respect, what is in particular affected is the size of the flow outlet opening.

According to a further embodiment of the suction cover device, the size ratio of the flow inlet opening to the flow outlet opening is configured variably. This size ratio corresponds to the mathematical notation as a fraction (size ratio=flow inlet opening:flow outlet opening). In this way, a fluid-dynamic suction inside the suction cover device can be changed. This particularly affects the ratio of the flow velocity at the flow inlet opening in relation to the flow velocity at the flow outlet opening.

According to a further development of the suction cover device, the size ratio has a minimum in the first extreme position and a maximum in the second extreme position. Thus, the first extreme position has the smallest difference in flow velocities between the flow inlet opening and the flow outlet opening. In this respect, the second extreme position has the highest difference in flow velocity between the flow inlet opening and the flow outlet opening.

According to a further embodiment of the suction cover device, the flow inlet opening is smaller than the flow outlet opening in order to create a fluid-dynamic suction effect inside the suction cover device. The suction cover device thus works according to the principle of a diffuser.

According to a further embodiment of the suction cover device, the plurality of cover housing segments partially overlap in an overlap region and contact each other in the overlap region. Therefore, the cover housing segments can move relative to one another within a determined range without creating undesirable recesses/gaps in the cover body through which a fluid could flow. Furthermore, in this way the stability of the suction cover device can be increased.

According to a further embodiment of the suction cover device, at least one of the plurality of cover housing segments has a flow diversion device on its outer side, which is configured to increase the fluid-mechanical resistance to a fluid flowing past. In this way, the fluid flowing past the outer side can be slowed down. This can lead to the fluid trying to choose a path with less fluid-mechanical resistance and the flow velocity at the flow inlet opening increases.

According to one embodiment of the kinetic tidal power plant, the operating voltage is at most 60 V. This reduces the cost of electronic components and minimizes electrical hazards due to defects.

According to one embodiment, the kinetic tidal power plant also has a controllable depth rudder for adjusting the floating depth in the water, which is arranged in an edge region in relation to the longitudinal direction of the tidal power plant. This makes it possible to react to the changing environmental conditions. In particular, damage or malfunctions can be reduced in exceptional circumstances such as flooding or icing.

The above embodiments and further developments can be combined with one another in any desired way, if appropriate. Other possible embodiments, further embodiments and implementations of the invention also include combinations of features of the invention not explicitly mentioned above or described below with respect to the embodiment examples. In this respect, the skilled person will in particular also add individual aspects as improvements or additions to the respective basic form of the present invention.

BRIEF DESCRIPTION OF THE DRAWINGS

The present invention is explained in more detail below with reference to the accompanying figures in the drawings. The figures show:

FIGS. 1A, 1B schematic top views of a suction cover device with cover housing segments according to embodiments of the invention;

FIG. 2 a schematic rear view of a suction cover device in the second extreme position according to the embodiment according to FIG. 1A;

FIGS. 3A, 3B, 3C, 3D a schematic rear view of a suction cover device in the first extreme position according to the design example shown in FIG. 2, wherein the restoring force is supported in each case by resilient cover housing segments (FIG. 3A), a spring device (FIG. 3B), two actuators (FIG. 3C) or one actuator (FIG. 3D);

(FIG. 8A: side view; FIG. 8B: top view; FIG. 8C: isometric representation) of a kinetic tidal power plant according to an embodiment of the invention.

In the figures of the drawing, identical elements, features, and components having the same function or the same action—unless stated otherwise—are each provided with the same reference numbers.

Figure 3B:
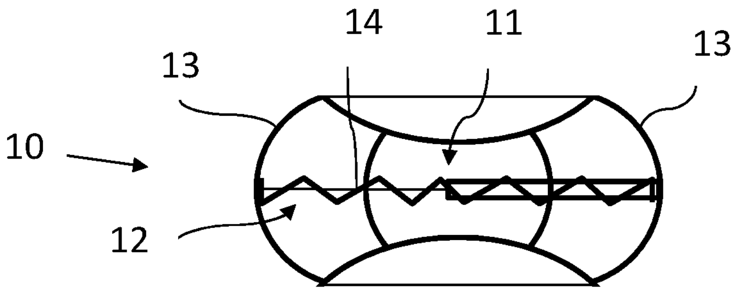

Although specific embodiments and developments are represented and described here, it will be preferable for the skilled person that a multiplicity of alternative and/or similar embodiments can replace the represented and described specific examples of embodiment, without departing from the scope of the present invention. This application is generally intended to cover all modifications or amendments to the specific examples of embodiment described herein.

The appended figures are intended to provide a further understanding of embodiments of the invention and, in combination with the description, serve to explain principles and concepts of the invention. Other examples of embodiment and many of the stated advantages emerge with regard to the drawings. The drawings are to be understood solely as diagrammatic drawings and the elements of the drawings are not necessarily represented true to scale with respect to one another. Direction-indicating terminology such as for example "above", "below", "left-hand", "right-hand", "over", "under", "horizontal", "vertical", "front", "rear" and similar indications are used solely for the purpose of explanation and do not serve to limit the generality to specific embodiments as shown in the figures.

FIGS. 1A and 1B show schematic top views of a suction cover device 10 with a plurality of cover housing segments 13. The suction cover device 10 also has a flow inlet opening 11 and a flow outlet opening 12. Referring to a flow direction A, the flow outlet opening 12 is arranged downstream of the flow inlet opening 11. The plurality of cover housing segments 13 extend between the flow inlet opening 11 and the flow outlet opening 12 substantially in the flow direction A. In this respect, deviations of this extension of the cover housing segments 13 of up to approximately 40°, in particular up to approximately 25°, from the flow direction A are provided. Furthermore, the plurality of cover housing segments 13 are provided in such a way that the plurality of cover housing segments 13 collectively form a conically shaped cover body. In this respect, the several cover housing segments 13 are continuously movable relative to one another between a first extreme position and a second extreme position in such a way that the flow velocity inside the suction cover device 10 can be controlled compared to the surrounding flow.

As an example, the suction cover device in FIGS. 1A and 1B also has a hinge device 19. The hinge device 19 supports the pivoting of the cover housing segments 13. As shown in FIG. 1A, for example, two of the four cover housing segments 13 can be connected via the hinge device 19. In this respect, the hinge device 19 is arranged in the area of the flow inlet opening 11, in particular with a pivot axis perpendicular to the flow direction A. Alternatively, as an example in FIG. 1B, four cover housing segments 13 are hinged to the hinge device 19. Moreover, this hinge device 19 has substantially the same features as those already described above with reference to FIG. 1A. Even though in these embodiments the suction cover device 10 comprises four cover housing segments 13, the invention is not limited to four cover housing segments 13, but may comprise any plurality of cover housing segments 13.

FIG. 2 shows a schematic rear view of a suction cover device 10 in the second extreme position according to the embodiment example according to FIG. 1A. The second extreme position can, for example, define a state in which the suction cover device 10 is present when it is not exposed to any fluid flow and the resulting forces and/or torques.

Furthermore, the suction cover device 10 is optionally configured to be oval when viewed transversely to the flow direction A. Alternatively or in combination, the suction cover device can be configured transversely to the flow direction A to be circular or likewise. In this respect, straight portions may be included in addition to curved portions.

In this respect, as illustrated in FIG. 2, the flow inlet opening 11 is smaller than the flow outlet opening 12 in order to generate a fluid-dynamic suction effect inside the suction cover device 10.

FIGS. 3A, 3B, 3C and 3D each show a schematic rear view of a suction cover device 10 in the first extreme position according to the embodiment example according to FIG. 2. In this respect, the plurality of cover housing segments 13 are provided to be movable relative to one another, for example substantially transversely to the flow direction A. It is not necessary for all cover housing segments 13 to be configured to be movable relative to one another; instead, individual ones of the plurality of cover housing segments 13 can be rigidly configured and/or connected to one another.

In addition, the suction cover device 10 in the first extreme position, viewed transversely to the flow direction A, can be configured in a manner comparable to or different from the second extreme position. This means, for example, that the suction cover device 10 can be configured to be oval in the first extreme position and round in the second extreme position. Other forms or mixed forms are conceivable.

Furthermore, for example, the size ratio of the flow inlet opening 11 to the flow outlet opening 12 is configured to be variable between the first and second extreme positions. This means that the quotient of flow inlet opening 11 and flow outlet opening 12 changes due to the movability of the plurality of cover housing segments 13 between the first and second extreme positions. Thus, the flow inlet opening 11 or the flow outlet opening 12 can optionally retain their size, while the corresponding other opening 11; 12 increases or decreases in size, or the sizes of the flow inlet opening 11 and the flow outlet opening 12 change in parallel, but in a different ratio. In this respect, the size ratio has a minimum in the first extreme position and a maximum in the second extreme position. Accordingly, the size of the flow outlet opening 12 decreases in the illustrated embodiments according to FIGS. 3A, 3B, 3C and 3D, while the size of the flow inlet opening 11 remains almost constant.

In the first extreme position, the suction cover device 10 is deformed in an elastic manner compared for example to the second extreme position. In the embodiment example according to FIG. 3A, at least some 13A of the plurality of cover housing segments 13 are made of an elastic material. The so-called elastic cover housing segments 13A cause a spring-elastic restoring force on the cover housing segments 13, which are coupled to the respective elastic cover housing segments 13A. The spring-elastic restoring force or the spring-elastic deformation resistance can be certain as a spring constant. In this respect, the spring constant for the elastic cover housing segments 13A can be constant in each case. Alternatively or additionally, the material composition and/or the geometry of the elastic cover housing segments 13A can vary along their extension in such a way that the spring constant of these elastic cover housing segments 13A varies along their extension. For example, the thickness of an elastic cover housing segment 13A decreases in the direction of flow direction A so that the elastic cover housing segment 13A has an increasing deformation when viewed in flow direction A.

FIG. 3B shows an example of a suction cover device 13 with a spring device 14. In this respect, the spring device 14 is arranged in particular inside the suction cover device 10. For example, the spring device 14 couples two of the plurality of cover housing segments 13, which are opposite each other. Thus, depending on the intended state of tension, the spring device 14 can support or inhibit the movability of the plurality of cover housing segments 13. Optionally, the spring device 14 can be coupled with a damper.

Figure 3C:
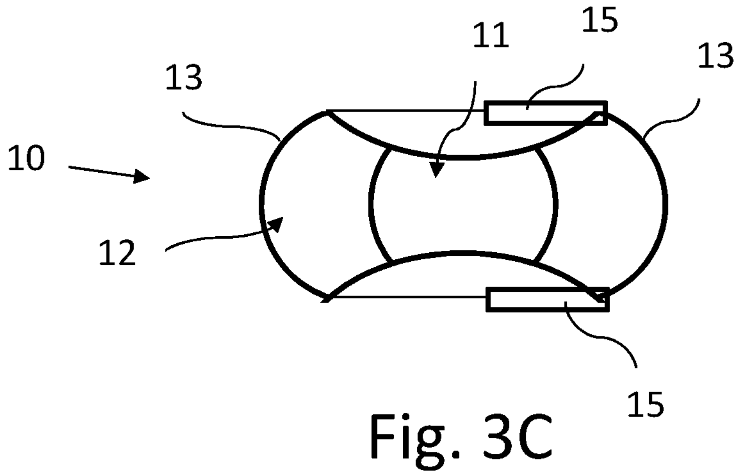

FIG. 3C shows an example of two actuators 15 for supporting the movability of the plurality of cover housing segments 13 between the first and second extreme positions in the suction cover device 10. In this respect, the actuators 15 are arranged in particular outside the suction cover device 10. For example, the actuators 15 couple two transition points each between the elastic cover housing segments 13A and the remaining cover housing segments 13. Thus, the actuator 15 can support the movability of the plurality of cover housing segments 13 depending on data measured by a sensor, in particular turbine performance data and/or weather data.

Figure 3D:
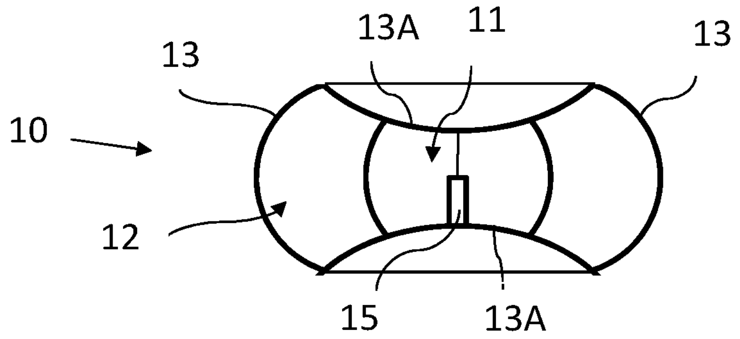

The embodiment according to FIG. 3D shows an example of a suction cover device 13 with an actuator 15 arranged inside the suction cover device 10. In this respect, the actuator 15 couples two elastic cover housing segments 13A. Thus, the movability of the elastic cover housing segments 13A can be directly supported.

It is clear to the skilled person that an actuator 15 can be used at any point where a spring device 14 is provided. The reverse principle also applies, as does any combination of spring device 14 and actuator 15 in the same suction cover device 10.

Figure 4A:
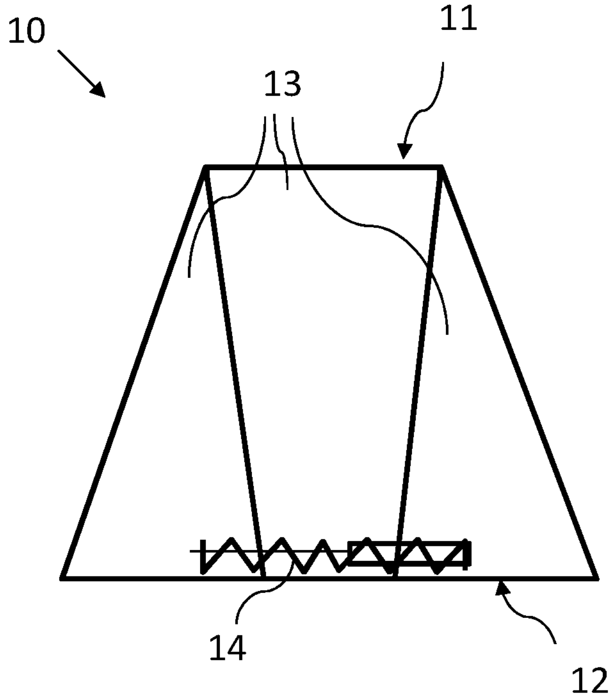
FIGS. 4A, 4B schematic top views of a suction cover device with pivotable cover housing segments according to a further embodiment of the invention, wherein the cover housing segments are in the second extreme position in FIG. 4A and in the first extreme position in FIG. 4B.
Figure 4B:
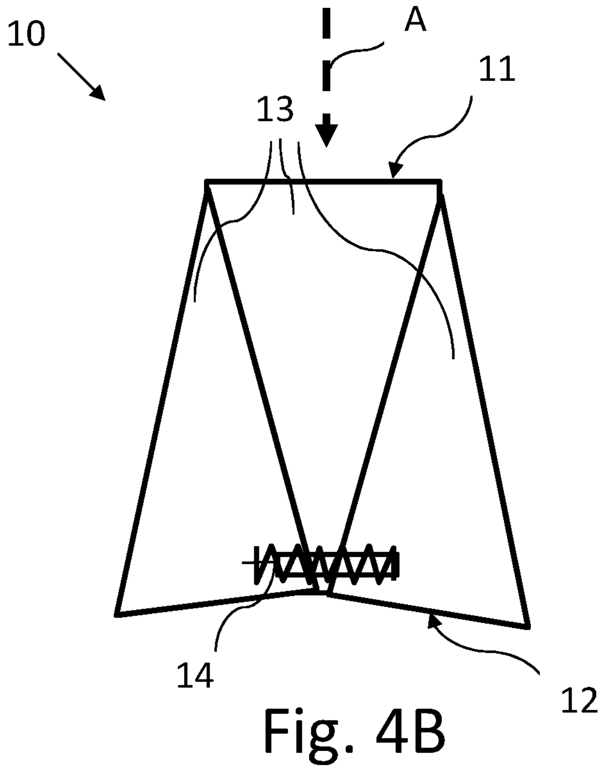

FIGS. 4A and 4B show schematic top views of a suction cover device 10 with pivotable cover housing segments 13. Optionally, the cover housing segments 13 are each configured to be rigid. In this respect, in particular two lateral cover housing segments 13 are pivotably hinged to at least two central cover housing segments 13. FIG. 4A illustrates in particular the cover housing segments 13 in the second extreme position. In FIG. 4B, however, the cover housing segments 13 are in the first extreme position.

In the first extreme position and in the second extreme position, the flow inlet opening 11 is smaller than the flow outlet opening 12 in order to create a fluid-dynamic suction effect inside the suction cover device 10. The size of the flow inlet opening 11 is constant according to the embodiments shown in FIGS. 4A and 4B. As the second extreme position has a larger flow outlet opening 12 than the first extreme position, the second extreme position has a stronger suction effect than the first extreme position.

Furthermore, the suction cover device 10 has, by way of example, two spring devices 14. In this respect, the spring devices 14 have a direction of action transversely to the flow direction A.

Figure 5A:
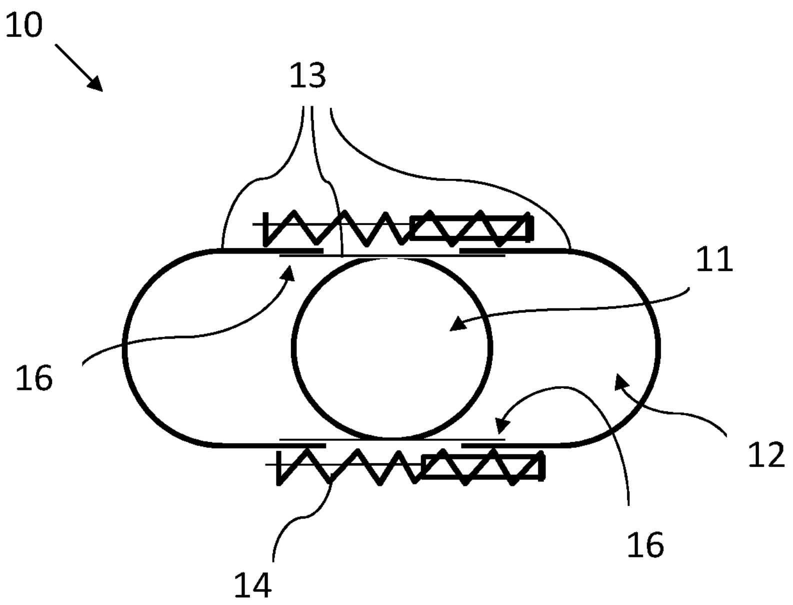
FIGS. 5A, 5B schematic rear views of the suction cover device according to the embodiment example shown in FIG. 4A or 4B.
Figure 5B:
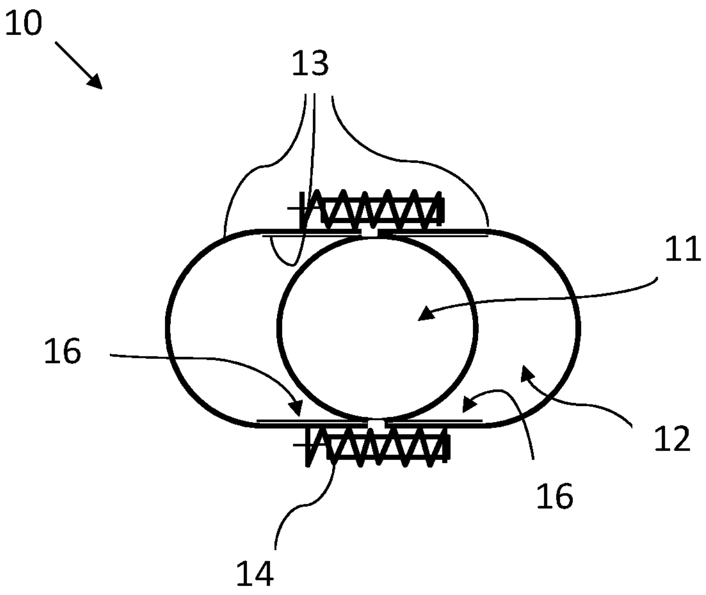

FIGS. 5A and 5B show schematic rear views of the suction cover device 10 according to the embodiment example according to FIGS. 4A and 4B. In particular, the two lateral cover housing segments 13 are shown therein, which partially overlap in an overlap region 16 with the central cover housing segments 13 and contact in the overlap region 16. As an example, the spring devices 14 are arranged outside the suction cover device 10, but are not limited to this arrangement, but can also be arranged inside the suction cover device 10 or in a different orientation.

Figure 6A:
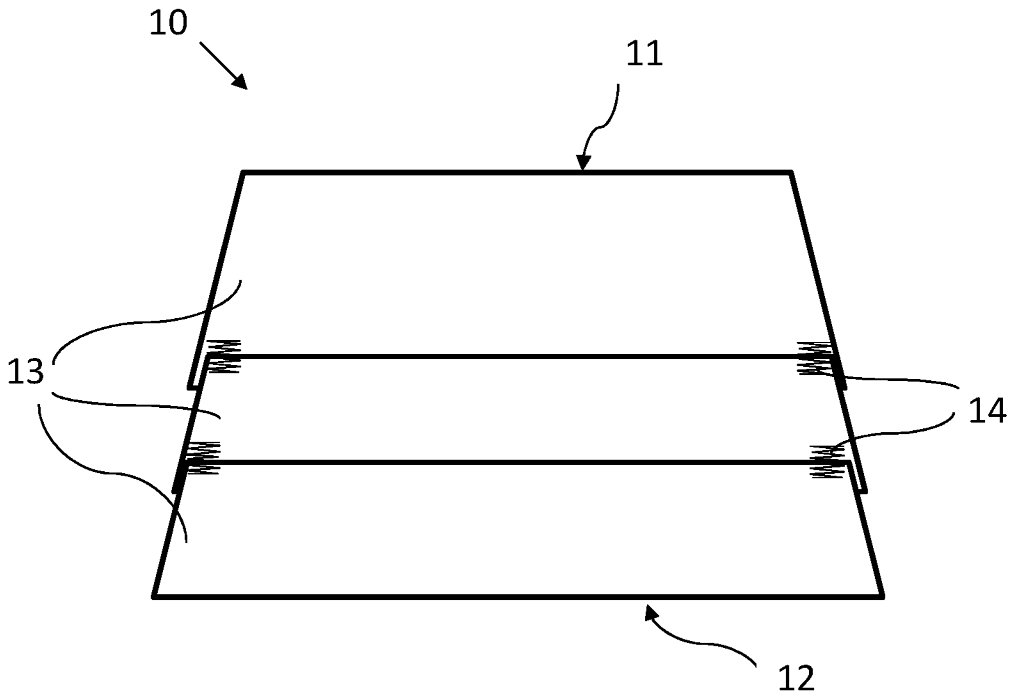
FIGS. 6A, 6B schematic top views of a suction cover device with cover housing segments that can be pulled apart according to a further embodiment of the invention, wherein the cover housing segments are in the first extreme position in FIG. 6A and in the second extreme position in FIG. 6B.
Figure 6B:
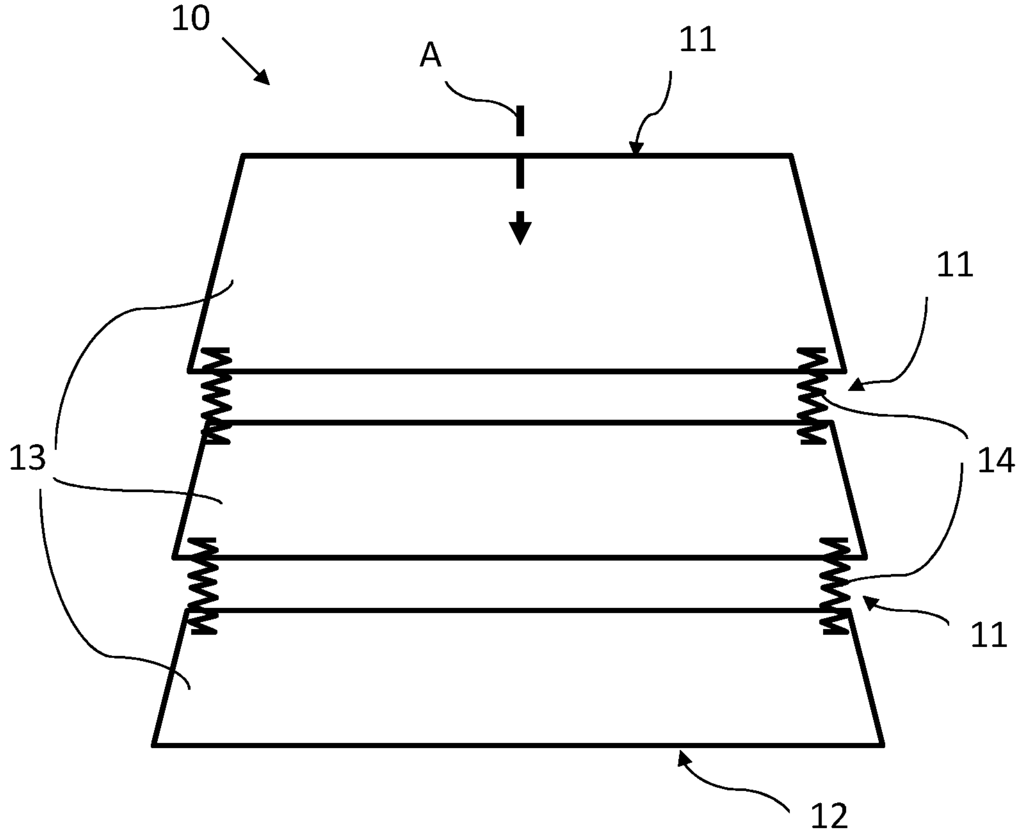

FIGS. 6A and 6B show schematic top views of a suction cover device 10 with cover housing segments 13 that can be pulled apart. In this respect, the cover housing segments 13 are in the first extreme position in FIG. 6A and in the second extreme position in FIG. 6B. In this respect, in particular, the plurality of cover housing segments 13 are substantially movable relative to one another along the flow direction A. The three cover housing segments 13 illustrated are coupled together, for example, by two spring devices 14 each. Each of the three cover housing segments 13 has a conical basic shape, for example.

In this respect, the size ratio of the flow inlet opening 11 to the flow outlet opening 12 is configured variably, for example. This means that the quotient of flow inlet opening 11 and flow outlet opening 12 changes due to the movability of the plurality of cover housing segments 13 between the first and second extreme positions. Thus, the flow inlet opening 11 or the flow outlet opening 12 can optionally retain their size, while the corresponding other opening 11; 12 increases or decreases in size, or the sizes of the flow inlet opening 11 and the flow outlet opening 12 change in parallel, but in a different ratio. In particular, the size ratio has a minimum in the first extreme position and a maximum in the second extreme position. Accordingly, the size of the flow inlet opening 11 increases from the first to the second extreme position in the illustrated embodiments according to FIGS. 6A and 6B, while the size of the flow outlet opening 12 remains constant.

In FIG. 6A, the flow inlet opening 11 is exemplarily smaller than the flow outlet opening 12 in order to generate a fluid-dynamic suction inside the suction cover device 10. In particular, the flow inlet opening 11 forms a continuous surface. In this respect, for example, the three cover housing segments 13 partially overlap in an overlap region 16, wherein the overlap regions correspond, for example, with the edge regions of the cover housing segments 13. In addition, the cover housing segments 13 contact each other in the overlap region 16 so that the overlap region 16 is fluid-tight. Optionally or additionally, the overlap region 16 can have sealing elements, such as rubber lips, sealing rings or the like.

FIG. 6B shows the suction cover device 10 in particular in the second extreme position. In the second extreme position according to this embodiment example, the three cover housing segments 13 are displaced relative to one another in the flow direction A in such a way that additional flow inlet openings 11 are provided between the cover housing segments 13. A fluid can flow into the suction cover device 10 from the side through the additional flow inlet openings 11. This reduces the suction effect. As the flow velocity of the fluid decreases, the additional flow inlet openings 11 also decrease until they are closed at a certain value.

Figure 7:
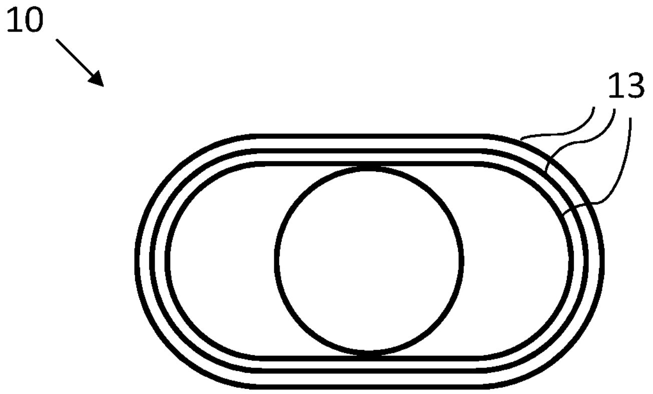
FIG. 7 a schematic rear view of the suction cover device according to the embodiment according to FIG. 6A.

FIG. 7 shows a schematic rear view of the suction cover device 10 according to the embodiment example according to FIG. 6A. In this respect, for example, the cross-section of the cover housing segments 13 is substantially identical in the first and second extreme positions.

Figure 8A:
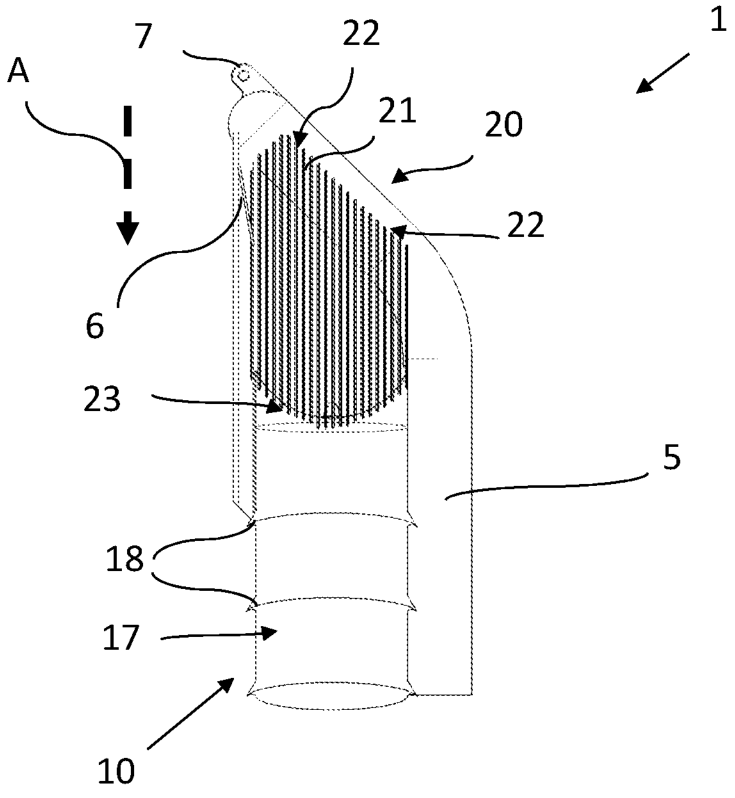
FIGS. 8A, 8B, 8C schematic representations
Figure 8B:
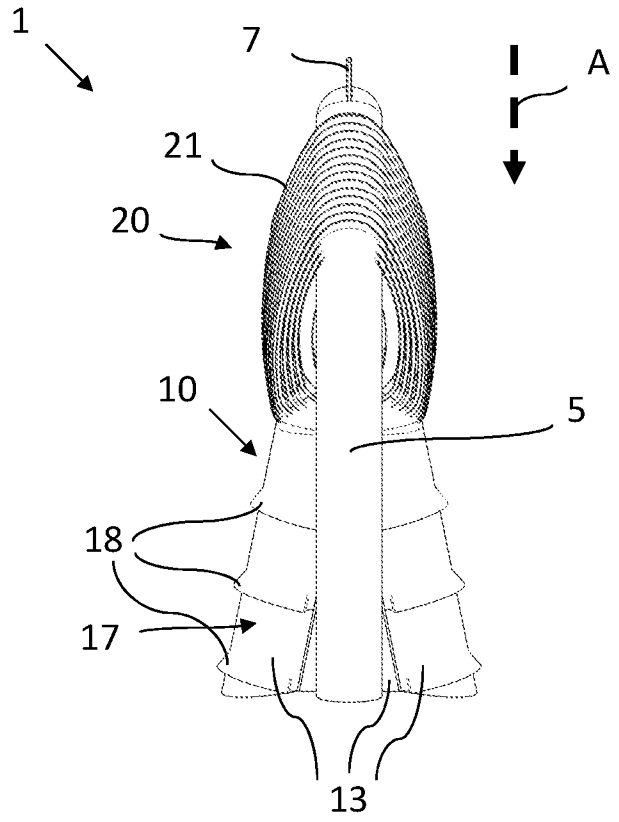
Figure 8C:
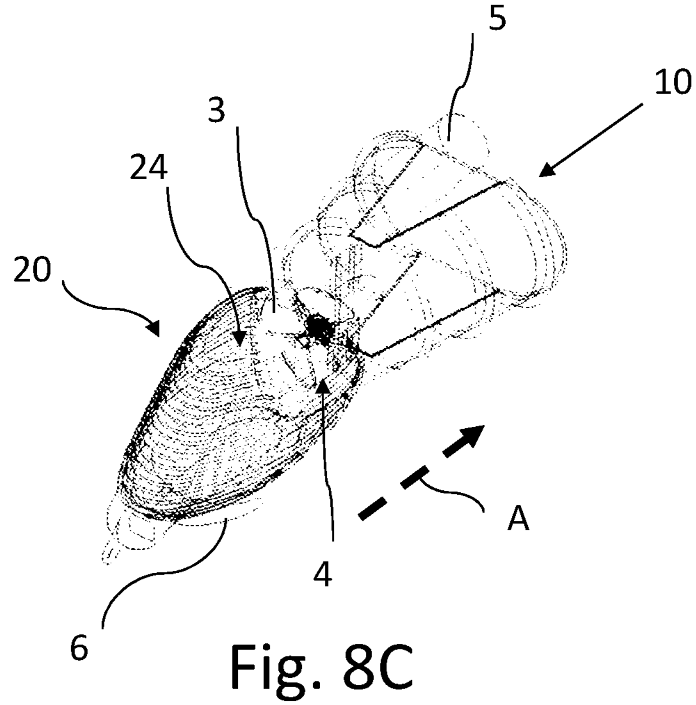

FIGS. 8A, 8B and 8C show schematic representations of a kinetic tidal power plant 1. The tidal power plant 1 comprises a flow generator 2, a computing device 20 and a suction cover device 10.

The flow generator 2 includes, for example, a rotor 3 whose axis of rotation corresponds approximately to the flow direction A or the longitudinal axis of the tidal power plant 1. The rotor 3 can be surrounded in portions by the suction cover device 10.

The computing device 20 is arranged along a flow direction A upstream of a flow inlet 4 of the flow generator 2 and is configured to protect the flow generator 2 from solid foreign bodies. The flow inlet 4 is shown in particular in FIG. 8C.

As an example, the computing device 20 can comprise several grid elements 21 which extend along the flow direction A from a first body 5 to a second body 2; 10. In this respect, for example, the plurality of grid elements 21 are each attached to the first body 5 by a first end 22 and to the second body 2; 10 by a second end 23. In addition, the grid elements 21 may be provided bent in such a way that together with the first and second bodies they surround a cavity 24, as shown in particular in FIG. 8C.

In this way, the flow inlet 4 of the flow generator 2 can be protected from foreign bodies by the computing device 20 in such a way that, in addition to damaging solid bodies, aquatic organisms, such as fish, which could be drawn through the flow inlet 4 of the flow generator 2, are also reduced. In this respect, the computing device 20 can be configured to pass a sufficient fluid flow in the flow direction A and provide it to the flow generator 2 so that it can be operated at an optimal operating point.

The grid elements 21 are not limited to a certain material, shape or cross-section. The grid elements 21 may comprise any metal, light metal, plastic, wood or the like or composite materials. Furthermore, the grid elements 21 may have a polygonal, round, oval, tubular or similar cross-section. Individual ones of the plurality of grid elements 21 may be different in design from the other grid elements 21 and/or vary in material and/or shape or cross-section along their longitudinal extent. Preferably, the grid elements 21 can be configured as sheet metal strips, rods or the like.

The cavity 24 within the meaning of the present invention denotes a volume space which is surrounded by the plurality of grid elements 21 and, if appropriate, additionally by the first and/or second body in such a way that a fluid can flow through this cavity/volume space 24 in the flow direction A, wherein solid foreign bodies above a certain size are prevented from penetrating into the cavity 24 by the computing device 20.

The suction cover device 10 is arranged downstream of the flow generator 2. In addition, its flow inlet opening 11 corresponds to the outer dimensions of the flow generator 2. The suction cover device 10 substantially corresponds to the suction cover device according to the embodiment example according to FIG. 4A, 5A or 4B, 5B. In addition, the suction cover device 10 can also have the features described below, for example.

Furthermore, the suction cover device 10 has, for example, six, eight or ten cover housing segments 13. In this respect, at least one of the cover housing segments 13 has a flow diversion device 18 on its outer side 17, as shown in particular in FIGS. 8A and 8B. The flow diversion device 18 is configured to increase the fluid-mechanical resistance to a fluid flowing past. In this way, the fluid flowing past is slowed down and consequently, for example, the fluid chooses the path of lower resistance and flows through the flow generator 2 into the suction cover device 10, which advantageously increases the power yield of the flow generator 2.

Furthermore, the operating voltage can be at most 60 V, for example.

In addition, the tidal power plant 1 may comprise a front body 5. The front body 5 is arranged upstream of the flow generator 2, for example, and is connected to the flow generator 2. Alternatively or additionally, the front body 5 can be connected to the suction cover device 10. This allows the front body to increase the stability of the tidal power plant. Furthermore, the front body 5 can, for example, be configured as a buoyancy body to prevent the tidal power plant 1 from sinking. In this respect, the front body can, for example, be made of a material or combination of materials with a density of less than 997 kg/m$^3$. Alternatively or additionally, the front body may contain gas inclusions whose buoyancy effect is large enough to compensate for the total weight of the tidal power plant.

In addition, the tidal power plant 1 may have a controllable depth rudder 6 for adjusting the floating depth in the water. The controllable depth rudder is arranged, for example, in a forward area in relation to the longitudinal direction A of the tidal power plant 1. In particular, the depth rudder 6 can be configured as a fin, for example, which is aligned horizontally.

Optionally, the tidal power plant 1 can have a fastening device 7. The fastening device 7 is positioned, for example, in the front area, in particular on a nose, of the tidal power plant 1. For example, the fastening device 7 can be configured as an eyelet, hook, loop or similar. This means that the tidal power plant 1 can be attached to a fixed point in the environment.

In the detailed description above, various features have been summarized in one or more examples so as to provide a more cogent representation. However, it should be clear here that the above description is of a purely illustrative, but in no way limiting nature. The description serves to cover all alternatives, modifications and equivalents of the various features and embodiments. Many other examples will become immediately clear to a skilled person owing to their expert knowledge in view of the above description.

The embodiments have been selected and described in order to be able to show, as clearly as possible, the principles on which the disclosure herein is based and the possible applications thereof in practice. As a result, skilled persons can optimally modify and use the disclosure herein and the various embodiments thereof with respect to the intended purpose thereof. In the claims and the description, the terms "containing" and "comprising" are used as linguistically neutral terminology for the corresponding term "including". Furthermore, use of the terms "a", "an" and "one" is not intended to fundamentally exclude a plurality of such described features and components.

LIST OF REFERENCE SIGNS

1 tidal power plant
2 flow generator
3 rotor
4 flow inlet
5 front body
6 depth rudder
7 fastening device
10 suction cover device
11 flow inlet opening
12 flow outlet opening
13 cover housing segments (elastic 13A)
14 spring device
15 actuator
16 overlap region
17 outer side
18 flow diversion device
19 hinge device
20 computing device
21 grid elements
22 first end
23 second end
24 cavity
25 distance
A flow direction/longitudinal direction

The invention claimed is:

1. A suction cover device (10) for a kinetic tidal power plant (1), comprising:

a flow inlet opening (11) and a flow outlet opening (12) which is arranged along a flow direction (A) downstream of the flow inlet opening (11); and a plurality of cover housing segments (13) which extend between the flow inlet opening (11) and the flow outlet opening (12) substantially in the flow direction (A) and are provided such that the plurality of cover housing segments (13) collectively form a conically shaped cover body, wherein the plurality of cover housing segments (13) are continuously movable relative to one another between a first extreme position and a second extreme position such that the flow velocity inside the suction cover device (10) can be controlled compared to the surrounding flow, wherein at least some (13A) of the plurality of cover housing segments (13) are made of an elastic material, and wherein a material composition and/or a geometry of the at least some of the plurality of cover housing segments (13A) changes along their extension such that a spring constant of the at least some of the plurality of cover housing segments (13A) varies along their extension.

2. The suction cover device according to claim 1, wherein the suction cover device (10) is of oval, circular or the like design when viewed transversely to the flow direction (A).

3. The suction cover device according to claim 1, wherein the plurality of cover housing segments (13) are provided substantially movable relative to one another transversely to the flow direction (A).

4. The suction cover device according to claim 1, wherein the size ratio of the flow inlet opening (11) to the flow outlet opening (12) is configured to be variable.

5. The suction cover device according to claim 4, wherein the size ratio has a minimum in the first extreme position and a maximum in the second extreme position.

6. The suction cover device according to claim 1, wherein the flow inlet opening (11) is smaller than the flow outlet opening (12) in order to generate a fluid-dynamic suction inside the suction cover device (10).

* * * * *